US011440480B2

(12) United States Patent
Dickman

(10) Patent No.: US 11,440,480 B2
(45) Date of Patent: Sep. 13, 2022

(54) LADDER HANGING BRACKET

(71) Applicant: John E. Dickman, Flowery Branch, GA (US)

(72) Inventor: John E. Dickman, Flowery Branch, GA (US)

(*) Notice: Subject to any disclaimer, the term of this patent is extended or adjusted under 35 U.S.C. 154(b) by 0 days.

(21) Appl. No.: 17/571,376

(22) Filed: Jan. 7, 2022

(65) Prior Publication Data

US 2022/0212605 A1 Jul. 7, 2022

Related U.S. Application Data

(60) Provisional application No. 63/134,868, filed on Jan. 7, 2021.

(51) Int. Cl.
*B60R 9/048* (2006.01)
*E06C 5/24* (2006.01)
*E06C 1/20* (2006.01)
*E06C 7/50* (2006.01)

(52) U.S. Cl.
CPC ............. B60R 9/0485 (2013.01); *E06C 1/20* (2013.01); *E06C 5/24* (2013.01); *E06C 7/50* (2013.01)

(58) Field of Classification Search
CPC .......... B60R 9/0485; E06C 7/14; E06C 1/393
See application file for complete search history.

(56) References Cited

U.S. PATENT DOCUMENTS

| | | | |
|---|---|---|---|
| 2,230,015 A | 1/1941 | Rich | |
| 2,439,430 A * | 4/1948 | Hurd | E06C 1/36 248/210 |
| 2,839,765 A * | 6/1958 | Cogley | B62D 33/0612 206/823 |
| 2,960,181 A | 11/1960 | John | |
| 3,025,924 A * | 3/1962 | Carlton | E06C 1/387 182/156 |
| 4,311,209 A * | 1/1982 | Primerano | E06C 7/48 182/206 |
| 4,482,029 A * | 11/1984 | Prochaska | E06C 5/02 182/127 |
| 5,460,240 A * | 10/1995 | Jones | E06C 7/16 182/116 |
| 5,573,081 A * | 11/1996 | Bartnicki | E06C 7/14 182/129 |
| 5,579,867 A * | 12/1996 | Jarrel | E06C 1/10 182/163 |
| 5,722,507 A * | 3/1998 | Kain | E06C 1/393 182/104 |

(Continued)

*Primary Examiner* — Brian D Nash

(74) *Attorney, Agent, or Firm* — Johnson, Marcou, Isaacs & Nix, LLC

(57) ABSTRACT

A step ladder is designed to hang on an OEM ladder on a recreational vehicle ("RV") while traveling on the road. The step ladder comprises a hanger bracket to hang the step ladder on the OEM ladder. The bracket is wider than a width of the legs of the step ladder to project over a rung of the OEM ladder. A hook on the bracket grabs the rung of the OEM ladder. The step ladder may be further secured to the OEM ladder by inserting a lock through the bracket and through or adjacent to the rung of the OEM ladder, or by inserting a lock through another rung of the OEM ladder and a retaining tab of the step ladder. A stabilizer attached to the step ladder and the RV can further stabilize the ladder when desired.

27 Claims, 10 Drawing Sheets

(56) References Cited

U.S. PATENT DOCUMENTS

| | | | | |
|---|---|---|---|---|
| 5,873,433 A * | 2/1999 | Katz | | E06C 7/14 248/210 |
| 6,000,497 A * | 12/1999 | Kain | | E06C 7/14 248/238 |
| 6,158,549 A * | 12/2000 | Hartman, Jr. | | E06C 7/48 182/206 |
| 6,390,238 B1 * | 5/2002 | Gibson | | E06C 1/387 182/161 |
| 6,401,861 B1 * | 6/2002 | Marszalek | | B60R 3/02 182/86 |
| 6,986,405 B2 | 1/2006 | Meeker | | |
| 7,044,270 B1 * | 5/2006 | McIntire | | E06C 7/18 182/206 |
| 7,066,299 B1 * | 6/2006 | Fleming | | E06C 7/48 182/127 |
| 7,108,103 B2 | 9/2006 | Meeker | | |
| 7,370,727 B2 | 5/2008 | Meeker | | |
| 7,849,967 B2 * | 12/2010 | Gibson | | E06C 1/393 182/25 |
| 7,861,663 B2 * | 1/2011 | Sedlack, II | | B63B 27/146 182/86 |
| 9,404,306 B2 * | 8/2016 | Russell | | E06C 7/188 |
| 9,567,804 B2 * | 2/2017 | Youlyahshiev | | E06C 7/48 |
| 9,593,531 B2 * | 3/2017 | Ballard | | E06C 7/48 |
| 9,920,572 B2 * | 3/2018 | Moss | | E06C 7/084 |
| 10,138,680 B2 * | 11/2018 | Williams | | E06C 7/14 |
| D840,055 S * | 2/2019 | Skubic | | D25/64 |
| 10,648,234 B2 * | 5/2020 | Skubic | | E06C 1/393 |
| 10,738,532 B2 * | 8/2020 | Badillo | | B60R 3/005 |
| 11,105,152 B1 | 8/2021 | Joldersma | | |
| 11,118,400 B1 * | 9/2021 | Davis | | E06C 7/14 |
| 2002/0189903 A1 * | 12/2002 | Krish, Jr. | | B63B 27/14 182/206 |
| 2004/0231920 A1 * | 11/2004 | Meeker | | E06C 7/087 182/165 |
| 2005/0098595 A1 * | 5/2005 | Smith | | B60R 9/0485 224/319 |
| 2005/0173191 A1 * | 8/2005 | Linzmayer | | E06C 5/02 182/127 |
| 2006/0108179 A1 * | 5/2006 | Sieb | | B60R 3/005 182/127 |
| 2006/0201747 A1 * | 9/2006 | Walton | | E06C 1/36 182/206 |
| 2008/0142300 A1 * | 6/2008 | Roberge | | E06C 7/14 182/129 |
| 2008/0202850 A1 * | 8/2008 | Anderson | | E06C 7/48 182/106 |
| 2010/0122871 A1 * | 5/2010 | Gottlinger | | E06C 5/02 182/106 |
| 2010/0200331 A1 * | 8/2010 | Hager | | E06C 1/06 182/129 |
| 2010/0230209 A1 * | 9/2010 | Hughes | | E06C 5/04 182/127 |
| 2014/0262617 A1 * | 9/2014 | Mulller | | E06C 7/14 182/107 |
| 2018/0170272 A1 | 6/2018 | Bleazard | | |
| 2019/0061629 A1 * | 2/2019 | Gemme | | E06C 7/182 |
| 2020/0095828 A1 * | 3/2020 | Demi | | E06C 7/14 |
| 2020/0217134 A1 * | 7/2020 | Fortier | | F16B 7/105 |
| 2021/0246725 A1 * | 8/2021 | Wernberg | | E06C 7/14 |

\* cited by examiner

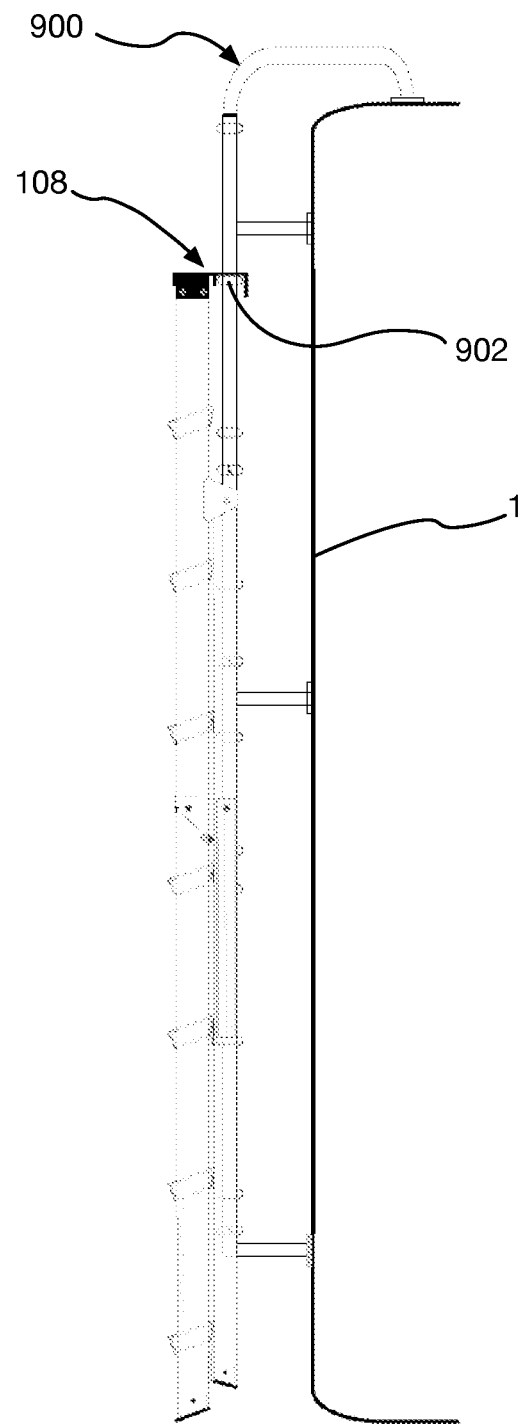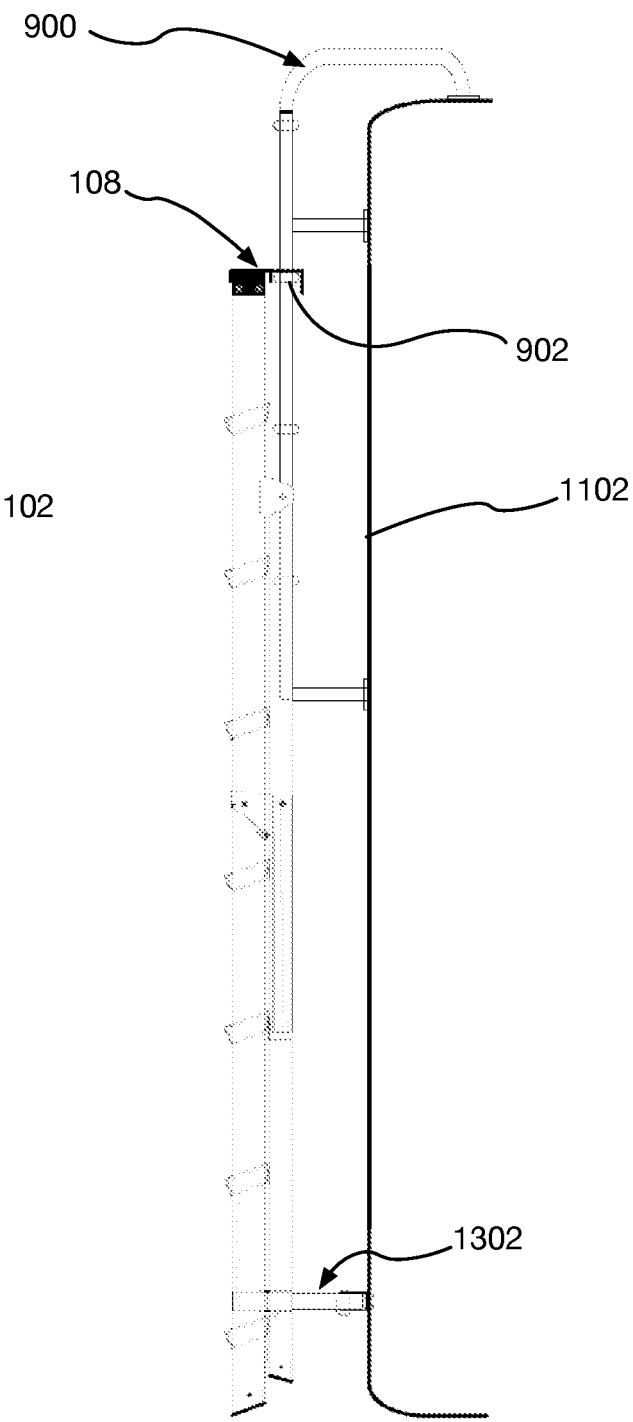
Figure 12                    Figure 13

LADDER HANGING BRACKET

CROSS REFERENCE TO RELATED APPLICATIONS

This application claims priority to U.S. Provisional Patent Application No. 63/134,868 filed Jan. 7, 2021 and titled "Ladder for Recreational Vehicles, Spreader for Step Ladder, and Ladder Components." The entire contents of the above-identified priority application are hereby fully incorporated herein by reference.

TECHNICAL FIELD

The technology disclosed herein relates to step/foldable ladders, and, more particularly, to a ladder hanging bracket that allows hanging the ladder for storage on recreational vehicles or other locations.

BACKGROUND

Recreational vehicle ("RV") owners encounter several issues to gain access to the roof of the vehicle or to reach higher areas on the sides of the RV. For example, many RVs include a ladder attached to the rear of the RV, which allows the owner to climb to the top of the RV. This conventional ladder is attached to the RV and is only useful to climb up the back of the RV to the top. Some manufacturers have made the lower section of these rear ladders removable from the unit to prevent unwanted access to the roof of the RV. However, the removed portion of the ladder is not useful to gain access to other parts of the RV because these rear ladders have a single support and rely on the frame of the RV for operation.

Many RV owners carry a second ladder for access to other parts of the RV, such as to the sides of the RV. These conventional second ladders include a step ladder, a telescopic ladder, or a foldable ladder. However, the owners must store these second ladders in a storage location of the RV, which occupies valuable storage space. Additionally, the owner likely must remove and replace other stored items just to gain access to the stored ladder when needed. RV storage is limited, and a ladder takes up a lot of space in a storage compartment.

BRIEF DESCRIPTION OF THE DRAWINGS

FIG. 12 is a side view depicting the ladder hanging on the full size RV OEM ladder.

FIG. 13 is a side view depicting the ladder hanging on a partial size RV OEM ladder.

DETAILED DESCRIPTION

Figure 1:
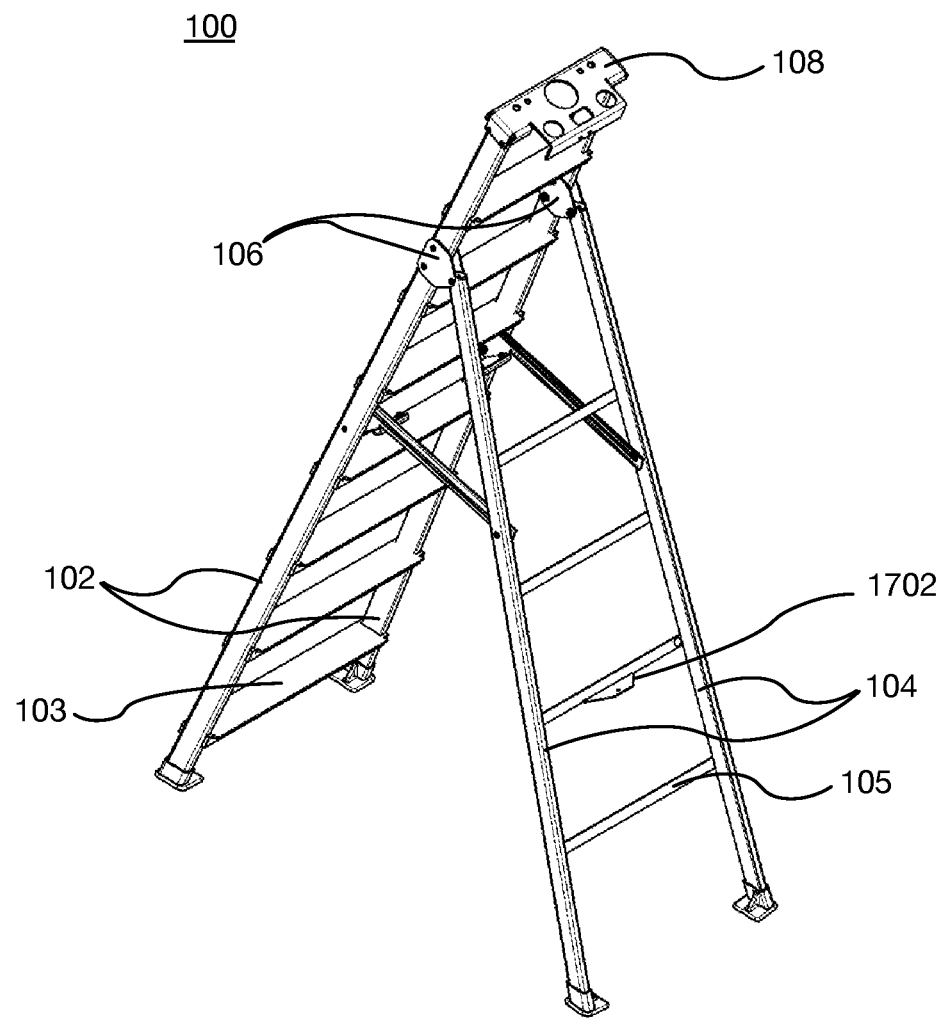
FIG. 1 is a rear perspective view of a step ladder comprising a hanging bracket, with the step ladder in an open position.

The innovations described herein relate to a ladder for recreational vehicles ("RV"), such as motorhomes, fifth wheels, and pull trailers, that is functional, tall enough to reach the top side of motorhomes, fifth wheels, and pull trailers, and able to be carried on the back of the RV instead of in the storage bay compartments.

The step ladder described herein is designed to hang on the existing original equipment manufacturer ("OEM") ladder on the outside of the RV while traveling on the road, instead of placing the ladder in RV storage bays to travel. Many RV OEM ladders are design to allow the lower portion of the ladder to be removed from the RV, leaving several upper rungs of the RV OEM ladder attached to the RV. The step ladder described herein can be hung on the RV from one or more of the remaining rungs of the RV OEM ladder. Alternatively, the step ladder can be hung from one or more rungs of the RV OEM ladder even if the lower portion of the RV OEM ladder is not removed or is not removable. This configuration allows for easy storage, transport, and retrieval of the step ladder. When attached to the RV, this configuration also provides a more stable ladder to climb to the top of the RV, as the step ladder includes wider steps than the conventional RV OEM ladder. The top of the step ladder provides a wider, more stable step to gain access to the roof of the RV, and helps when climbing down from the roof of the RV.

Storing the step ladder on the outside of the RV leaves more space in the storage bays and provides easier ladder access when needed. Additionally, a ladder that is tall enough to reach upper sides of an RV for maintenance can be stored on the outside of the RV. High areas of an RV require regular maintenance, including, for example, front windshield cleaning, awning service, slide toppers, cleaning of motorhome, or cleaning of Fifth wheel front dome.

The step ladder described herein includes a hanging mechanism (such as a hanging bracket) to hang the step ladder from one of the rungs of the RV OEM ladder. For example, the step ladder includes a bracket attached to the step ladder, which includes a hook portion configured to hang on the RV OEM ladder. The bracket can be coupled to the step ladder at the location of the top of the step ladder. The bracket also can be coupled to the step ladder at a lower location, as desired (for example, at a point lower than the top of the step ladder). Additionally, multiple brackets may be used to hang the step ladder from two or more rungs of the RV OEM ladder, as desired. Using multiple brackets over multiple rungs of the RV OEM ladder may provide a more secure/stable attachment of the step ladder to the RV OEM ladder.

The innovations described herein relate to a hanging bracket for a step ladder that allows hanging the step ladder for storage, particularly for recreational vehicle ("RV") storage, and to security restraints to hold the ladder in place. The hanging bracket and restraints for step ladders according to various aspects of the technology discussed herein will now be described with reference to the Figures.

A step ladder is a type of ladder having two legs. The two legs are connected at a hinge point and fold together via the hinge point for storage of the step ladder. The two legs also spread apart via the hinge point to create an "A-frame" type of structure to support the open ladder. A step ladder is sometimes called a "foldable ladder."

Figure 2:
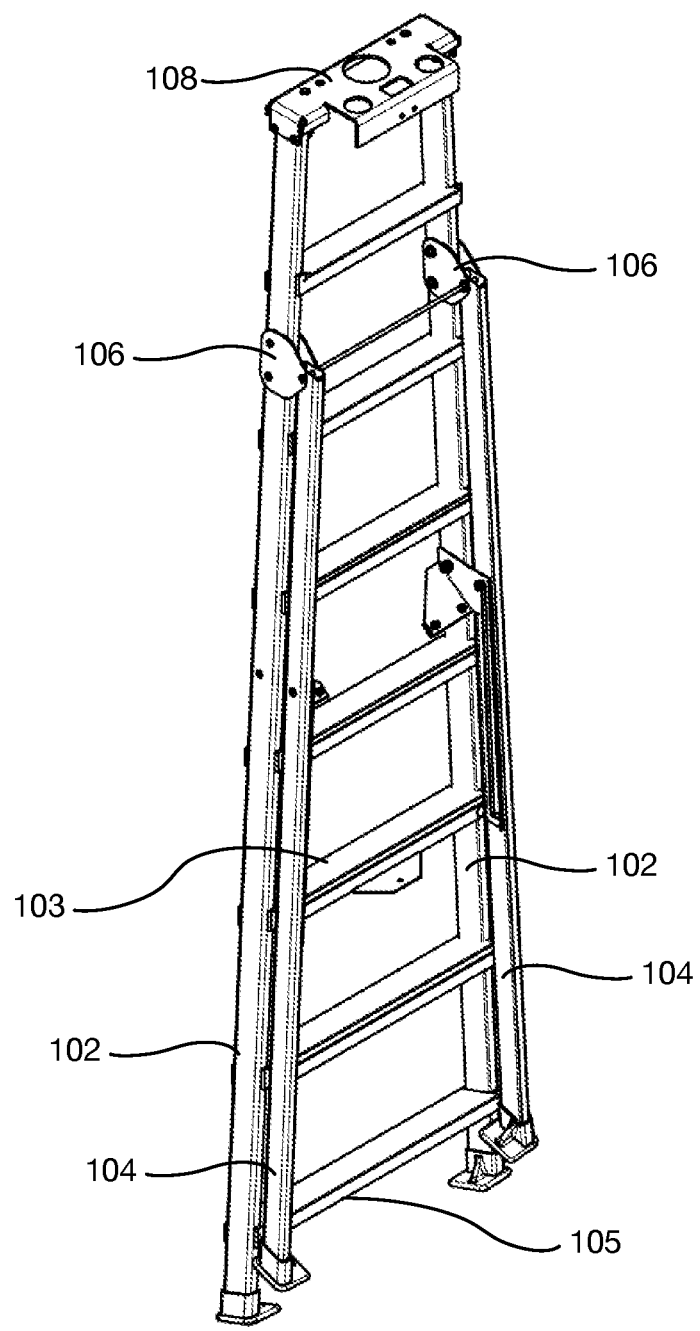
FIG. 2 is a rear perspective view of the step ladder in a closed position.
Figures 3, 4:
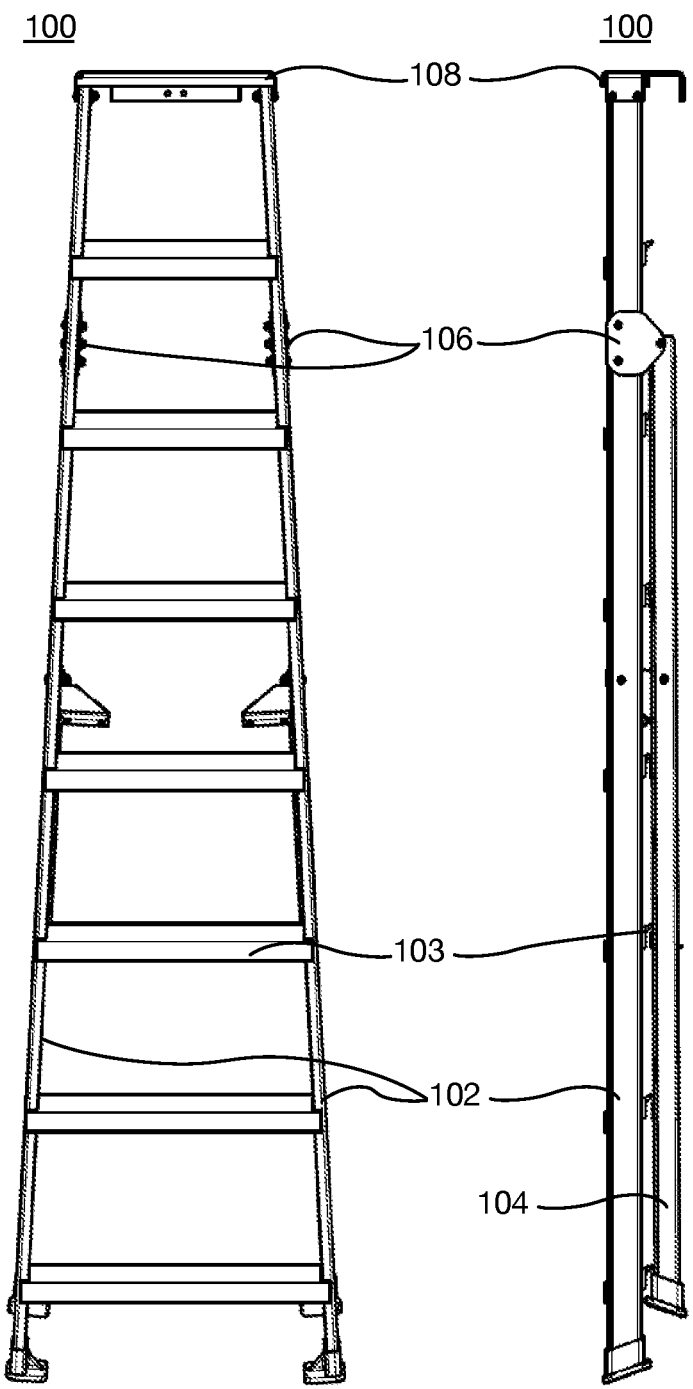
FIG. 3 is a front view of the step ladder in the closed position.
FIG. 4 is a side view of the step ladder in the closed position.

FIGS. 1-4 depict a step ladder 100 comprising a hanging bracket 108. FIG. 1 is a rear perspective view of the step ladder 100 comprising the hanging bracket 108, with the step ladder 100 in an open position. FIG. 2 is a rear perspective view of the step ladder 100 in a closed position. FIG. 3 is a front view of the step ladder 100 in the closed position. FIG. 4 is a side view of the step ladder 100 in the closed position.

As depicted in FIGS. 1-4, the step ladder 100 comprises a pair of front legs 102 and a pair of rear legs 104 coupled together via hinges 106. The hinges 106 allow the rear legs 104 to spread from the front legs 102 as shown in the open configuration depicted in FIG. 1. The hinges 106 also allow the rear legs 104 to collapse toward the front legs 102 as shown in the closed configuration depicted in FIGS. 2-4. The pair of front legs 102 are connected via multiple steps 103. The pair of rear legs 104 are connected via multiple supports 105. Only one step 103 and one support 105 are labeled in the figures. The other steps 103 and supports 105 are easily identified in the figures.

Figure 5:
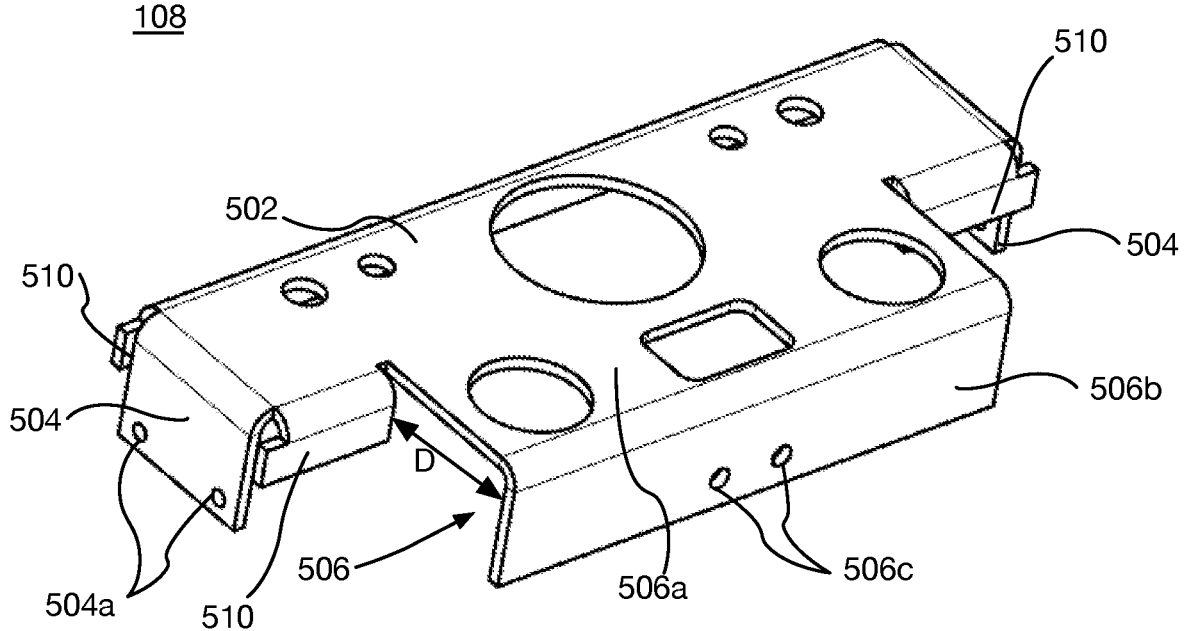
FIG. 5 is a top perspective view of the hanger bracket.
Figure 6:
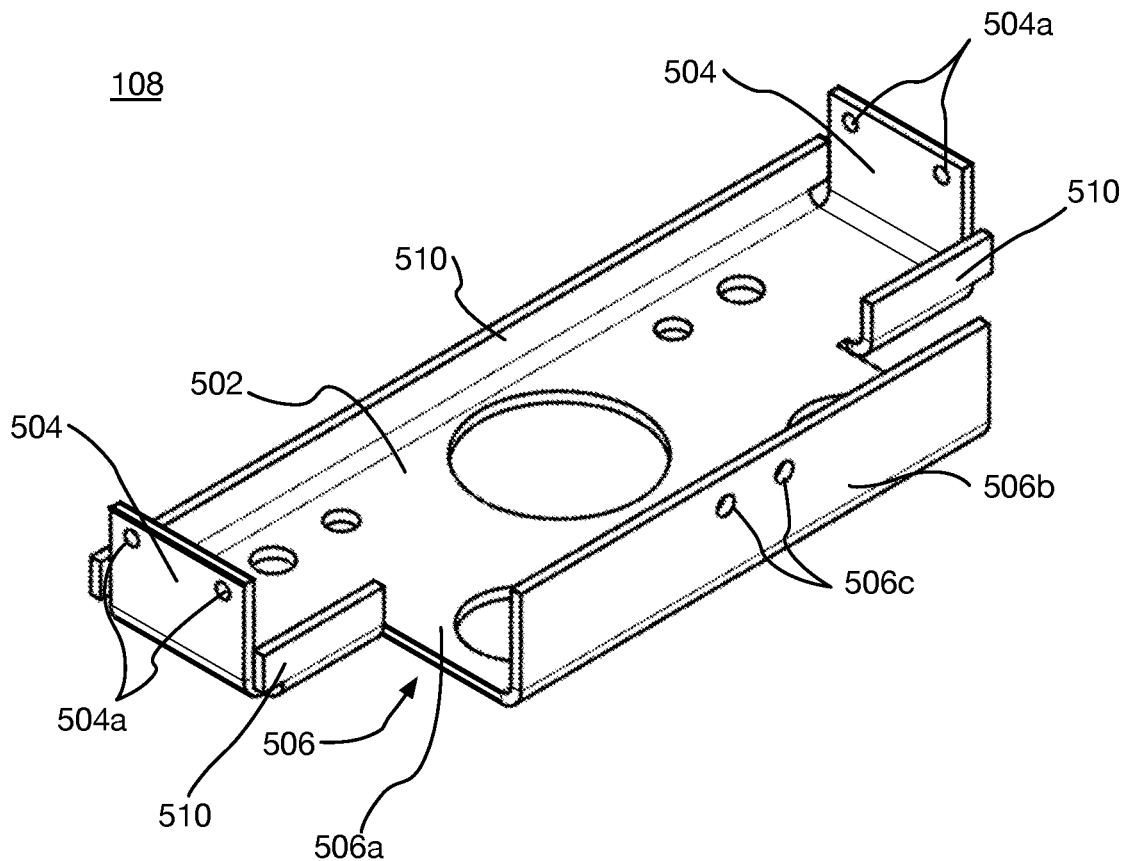
FIG. 6 is a bottom perspective view of the hanger bracket.
Figure 7:
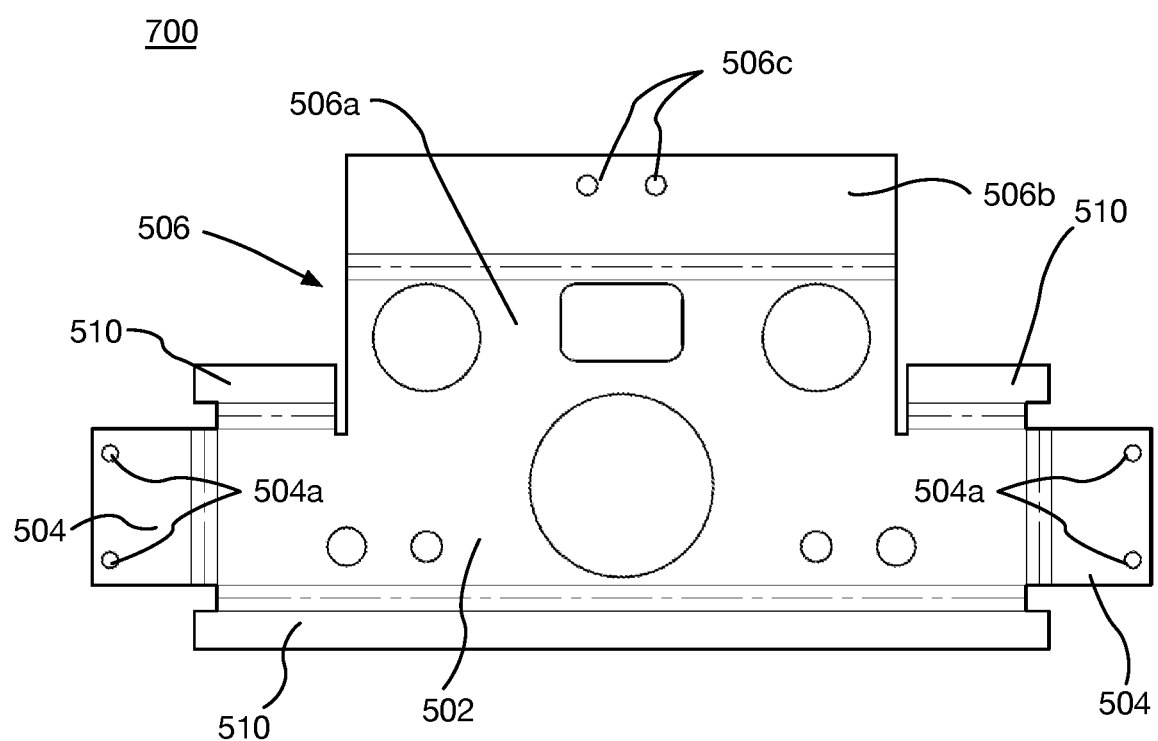
FIG. 7 is a plan view of a single plate outlining an unformed hanger bracket.
Figure 8:
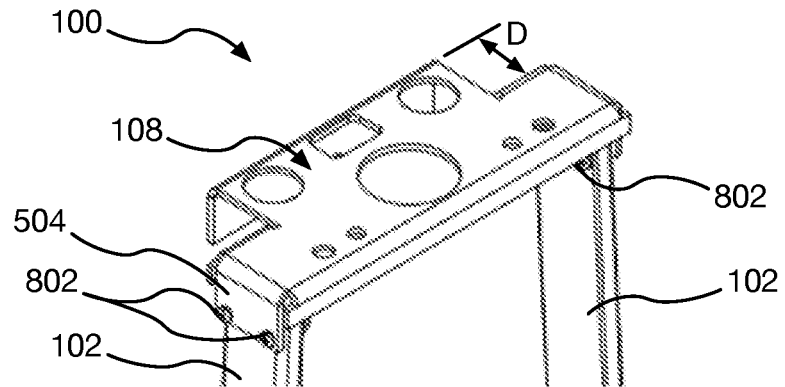
FIG. 8 is a front perspective view of the hanger bracket attached to the top of front legs of a ladder.
Figure 9:
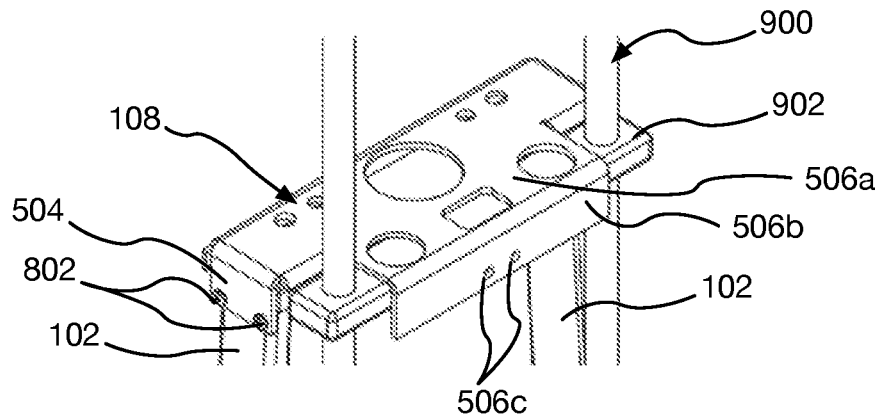
FIG. 9 is a rear perspective view depicting a ladder hanging by its hanger bracket on an RV OEM ladder.
Figure 10:
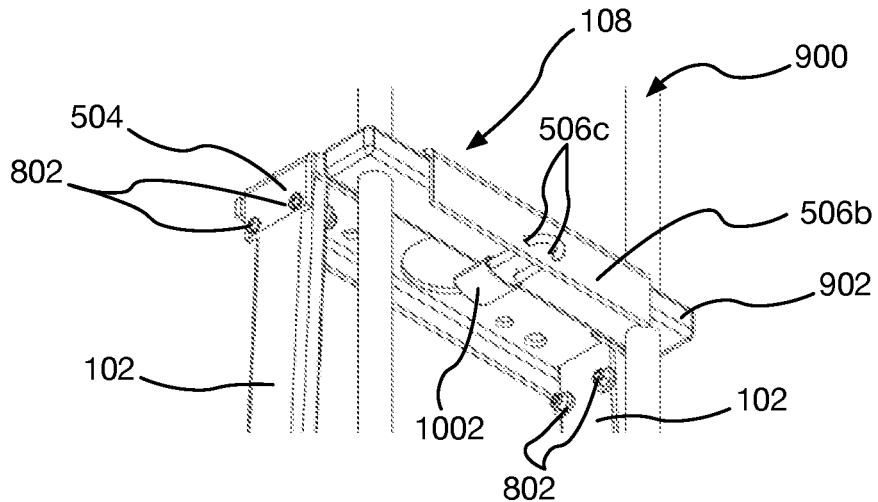
FIG. 10 is a rear perspective view depicting a ladder hanging by its hanger bracket on an RV OEM ladder and locked in position.

As shown in FIGS. 1-4, the hanging bracket 108 is coupled to the ladder 100 at a top of the front legs 102 of the ladder 100. The hanging bracket 108 will be described in further detail with reference to FIGS. 5-10. FIG. 5 is a top perspective view of the hanger bracket 108. FIG. 6 is a bottom perspective view of the hanger bracket 108. FIG. 7 is a plan view of a single plate outlining an unformed hanger bracket 108. FIG. 8 is a front perspective view of the hanger bracket 108 attached to the top of front legs 102 of a ladder. FIG. 9 is a rear perspective view depicting a ladder 100 hanging by its hanger bracket 108 on an RV OEM ladder. FIG. 10 is a rear perspective view depicting a ladder 100 hanging by its hanger bracket 108 on an RV OEM ladder and locked in position.

As shown in the figures, the hanger bracket 108 comprises a base 502. The base 502 is a cross member disposed between two arms 504 disposed on either side of the base 502. The arms 504 comprise apertures 504a therein, which are useful to couple the hanger bracket 108 to a ladder. For example, fasteners can be inserted through the apertures 504a in the arms 504 to couple the hanger bracket 108 to the ladder 100, as illustrated in FIGS. 1-4 and 8-10. The fasteners may be screws, bolts, rivets, or any other suitable fastener, and the fasteners may attach through the front legs 102 of the ladder 100 directly or via corresponding holes in the front legs 102.

Additionally or alternatively, the base 502 may comprise suitably sized apertures therein to attach the base 502 to a rung or other horizontal surface of a ladder. In this case, the arms 504 may be omitted when a sufficient attachment is achieved via fasteners in the apertures of the base 502.

The width of the base 502 between the arms 504 can be sized to fit any desired ladder size by sizing the width of the base 502 to correspond to a distance between the legs of the ladder. In this manner, the hanger bracket 108 can be sized to fit any ladder.

The base 502 is connected to a hanger 506 that extends from the base 502. The hanger 506 comprises an extension 506a that extends laterally from the base 502. The hanger 506 also comprises a hook 506b extending from a distal end of the extension 506a. The hook 506b extends generally orthogonally from the extension 506a to create the hanger 506, which can be used to hang a ladder from any suitable surface. The extension 506a can be sized to position the hook 506b a sufficient distance D away from the base 502 to allow the extension to rest on a desired support surface and for the hook 506b to pass over a far side of the desired support surface for hanging. For example, to hang a ladder on a rung of an RV OEM ladder, the extension 506a is sized corresponding to a top width of the RV OEM ladder rung, and the hook 506b will contact a back side of the RV OEM ladder rung (as shown in FIGS. 9 and 10 and discussed hereinafter). In this manner, the hanger bracket 108 can be sized to fit any desired hanging surface.

The hook 506b of the hanger 506 comprises one or more apertures 506c therein. In operation, a lock may be inserted into the apertures 506c to secure the hanger bracket 108 to a support surface.

The base 502 and hanger 506 also can comprise various apertures, slots, trays, or others suitable designs, which are useful to hold tools or other items. Any desired number and configuration of such components may be utilized. FIGS. 5-7 depict multiple exemplary apertures.

As shown in FIGS. 5-6, the hanger bracket 108 comprises multiple flanges 510 extending generally orthogonally from the base 502. The flanges 510 provide structural support for the hanger bracket 108. The flanges 510 also can help position the hanger bracket 108 over a rung of a ladder when installed over the rung. The flanges optionally may be omitted.

As shown in FIG. 7, the hanger bracket 108 can be integrally formed from a single piece of material. FIG. 7 depicts a plan view of a cutout of an unformed hanger bracket 700 in a single piece of flat material. The unformed hanger bracket 700 can be bent along the dashed lines shown in FIG. 7 to form the hanger bracket 108 depicted in FIGS. 5-6.

FIG. 8 illustrates the hanger bracket 108 attached to the top of front legs 102 of a ladder 100 via fasteners 802. FIGS. 9 and 10 illustrate a ladder 100 hanging on a rung 902 of an RV OEM ladder 900. The hanger bracket 108 is attached to the front legs 102 of the ladder 100. Fasteners 802 in the arms 504 of the hanger bracket 108 couple the hanger bracket 108 to the front legs 102 of the ladder 100. The ladder 100 is positioned so the extension 506a of the hanger 506 rests on a horizontal surface of the rung 902 of the RV OEM ladder 900 and so the hook 506b of the hanger 506 extends over a far, vertical surface of the rung 902 of the RV OEM ladder 900. b As shown in FIG. 10, a lock 1002 may be inserted in the apertures 506c of the hanger bracket 108 to secure the ladder 100 to the RV OEM ladder 900. As shown, the lock 1002 is positioned under the rung 902, which prevents taking the ladder 100 off of the rung 902. In other embodiments, the rung 902 may have one or more corresponding holes, and the lock 1002 may be inserted through the apertures 506c of the hanger bracket 108 and the corresponding hole(s) of the rung 902. Any suitable device can be used to secure the ladder 108 to the RV OEM ladder 900. For example, a bolt/nut combination can secure the ladder 108 to prevent the ladder 108 from falling off the RV OEM ladder 900 while driving.

Figure 11:
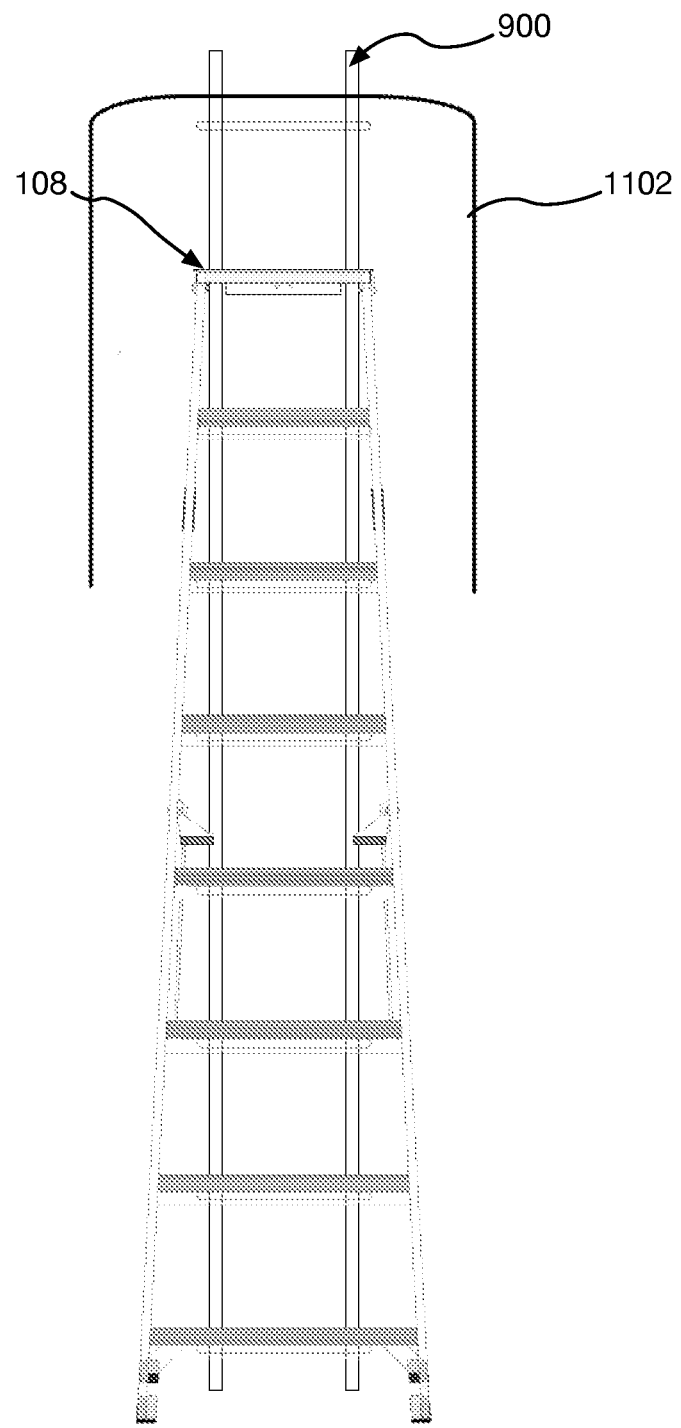
FIG. 11 is a front view depicting a ladder hanging on a full size RV OEM ladder.

FIGS. 11-13 further illustrate the ladder 100 hanging on an RV OEM ladder on an RV 1102. FIG. 11 is a front view depicting a ladder 100 hanging on a full size RV OEM ladder. FIG. 12 is a side view depicting the ladder 100 hanging on the full size RV OEM ladder. FIG. 13 is a side view depicting the ladder 100 hanging on a partial size RV OEM ladder. In FIGS. 11-13, the RV 1102 is shown as a partial outline of a rear view of an RV. As shown in each of FIGS. 11-13 the hanger bracket 108 of the ladder 100 is hanging on the rung 902 of the RV OEM ladder 900. The RV OEM ladder 900 is depicted in FIGS. 11-12 as a full size ladder, which includes additional rungs at a lower part of the ladder. The RV OEM ladder 900 is depicted in FIG. 13 as a partial size ladder, which only extends part of the way down the RV 1102.

The ladder 100 can be secured to lower rungs or supports of the RV OEM ladder to stabilize the ladder 100 on the RV 1102. For example, the ladder 100 can be secured using rope, bungee cord, wire, or other suitable item. As shown in FIG. 13, a stabilizer 1302 can be utilized to secure the ladder 100 to the RV 1102. The stabilizer 1302 is attached on one end to the ladder 100 and on another end to the RV 1102.

Figure 14:
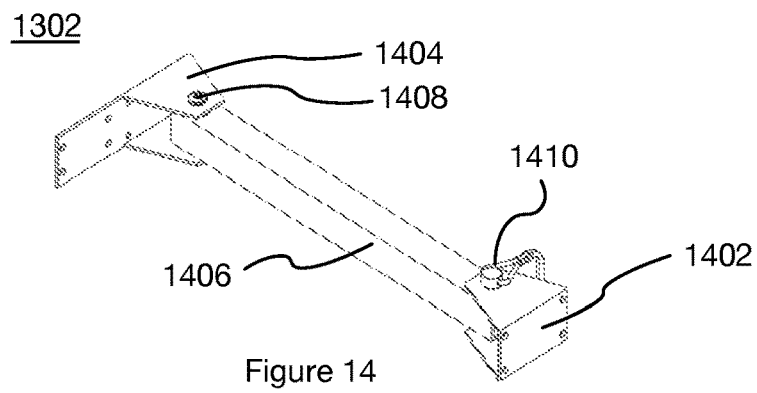
FIG. 14 is a perspective view of a ladder stabilizer.

The stabilizer 1302 will be described in further detail hereinafter with reference to FIGS. 14-16. FIG. 14 is a perspective view of a ladder stabilizer 1302. As shown in FIG. 14, the stabilizer 1302 comprises a stabilizer arm 1406 connected to stabilizer feet 1402, 1404. One end of the stabilizer arm 1406 is coupled pivotably coupled to the stabilizer foot 1404 via a fastener 1408, such as a bolt, screw, rivet, removable pin, or other suitable fastener. The other end of the stabilizer arm 1406 is removably coupled to the stabilizer foot 1402 via a removable pin 1410, such as a clevis pin or others suitable fastener. In operation, one of the stabilizer feet 1402, 1404 is coupled to the ladder 100, and the other of the stabilizer feet 1402, 1404 is coupled to the RV 1102. The chosen fasteners 1408, 1410 can be chosen for the desired function. At least one of the fasteners 1408, 1410 is removably coupled to a corresponding one of the stabilizer feet 1402, 1404 to allow quick attachment and removal of the ladder 100 from the RV 1102.

Figure 15:
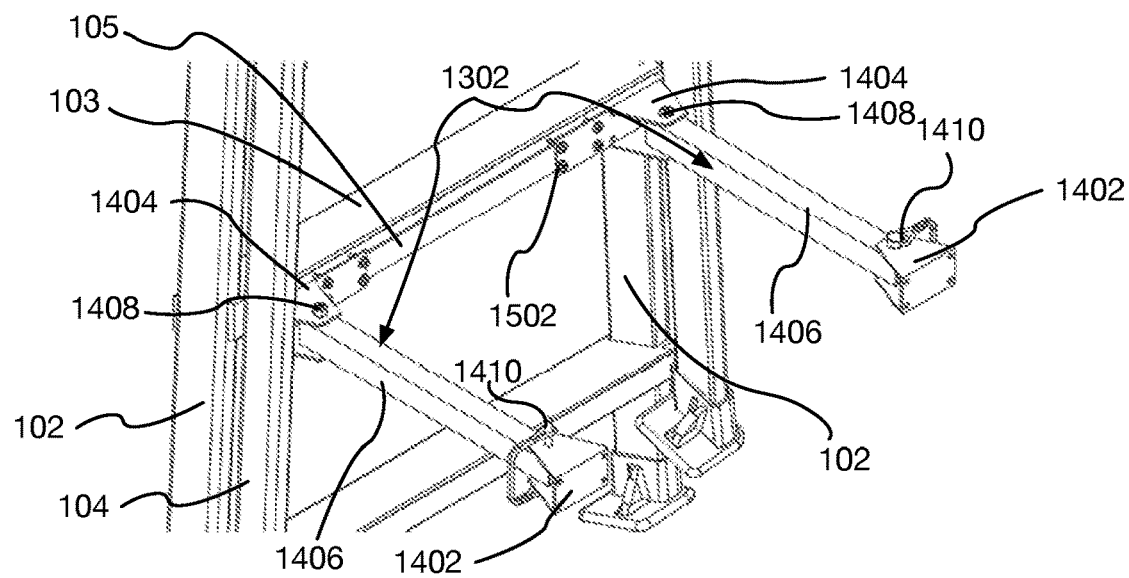
FIG. 15 is a perspective view of ladder stabilizers coupled to a rung of a ladder.

FIG. 15 is a perspective view of ladder stabilizers 1302 coupled to a rung 103 of the ladder 100. In FIG. 15, the stabilizer foot 1404 of a stabilizer 1302 is attached to the support 105 of the ladder 100 via fasteners 1502, such as screws or other suitable fasteners. The stabilizer foot 1402 would be attached to the RV 1102, for example, see FIG. 13. One or multiple stabilizers 1302 can be utilized. FIG. 15 depicts two stabilizers 1302 coupled to the ladder 100. Although illustrated in FIG. 15 as being attached to the support 105 of the ladder 100, the stabilizer foot 1404 could be attached to a step 103 of the ladder 100. Additionally, stabilizer feet 1402, 1404 are interchangeable. Two feet 1402 can be used, two feet 1404 can be used, and/or the feet 1402, 1404 can be switched in the positions on the ladder 100 and the RV 1102.

Figure 16:
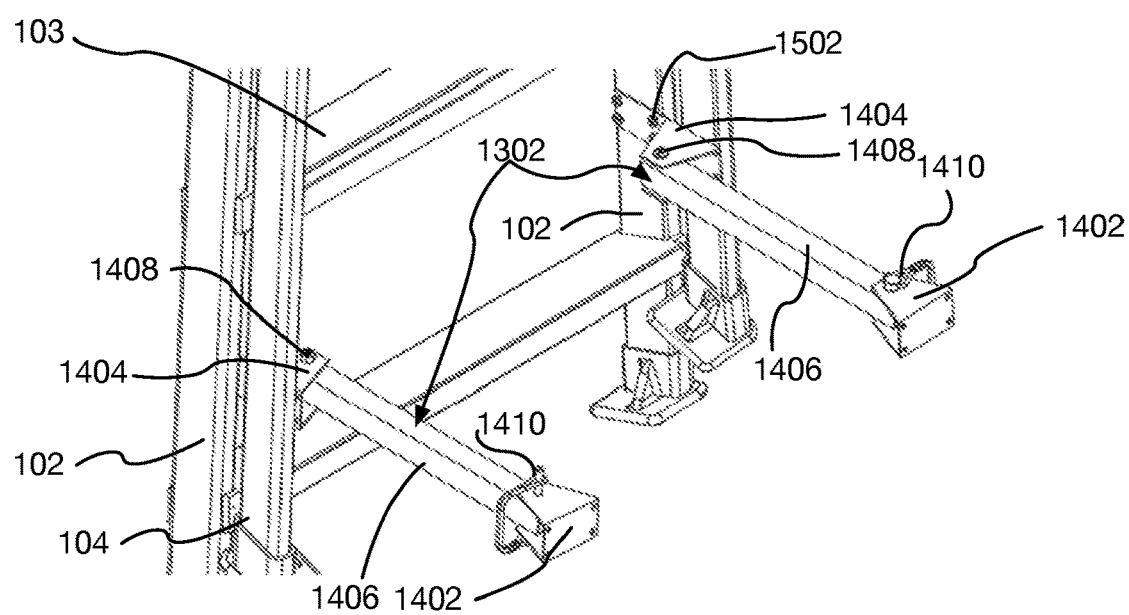
FIG. 16 is a perspective view of ladder stabilizers coupled to front legs of a ladder.

FIG. 16 is a perspective view of ladder stabilizers 1302 coupled to the front legs 102 of the ladder 100. In FIG. 16, the stabilizer foot 1404 of a stabilizer 1302 is attached to the front legs 102 of the ladder 100 via fasteners 1502, such as screws or other suitable fasteners. The stabilizer foot 1402 would be attached to the RV 1102, for example, see FIG. 13. One or multiple stabilizers 1302 can be utilized. FIG. 16 depicts two stabilizers 1302 coupled to the ladder 100. Although depicted in FIGS. 15-16 as being coupled to the rung 103 or the front legs 102 of the ladder 100, the stabilizer 1302 alternatively can be coupled to the support 105 or the rear legs 104 of the ladder 100.

Figure 17:
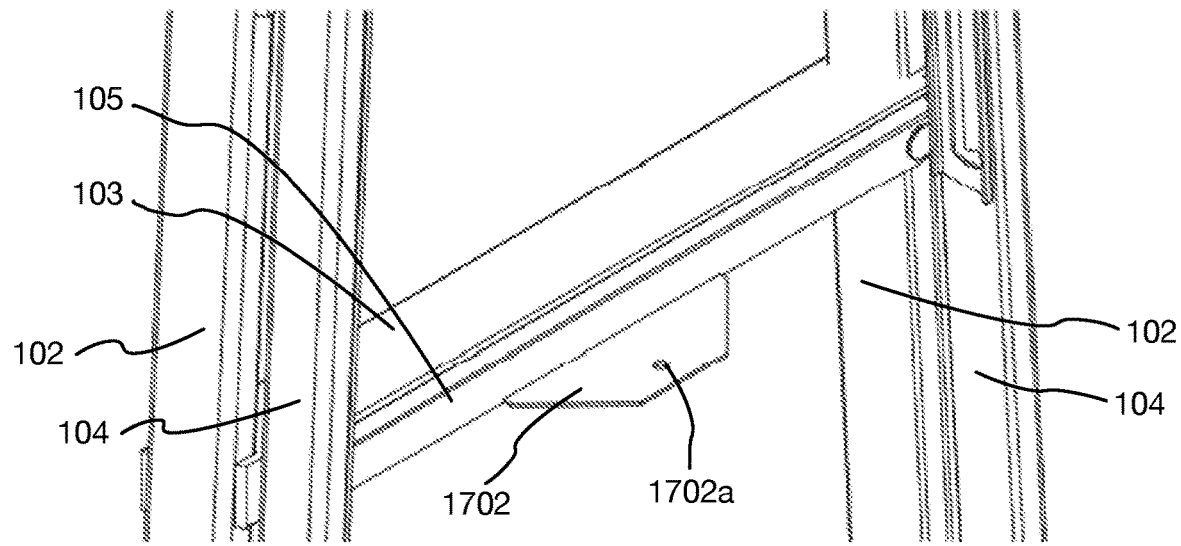
FIG. 17 is a close up view of the retaining tab depicted in FIG. 2.

An alternative retainer will now be described with reference to FIGS. 2, 17, and 18. Referring back to FIG. 2, the ladder 100 further comprises a retaining tab 1702 coupled to one of the supports 105 between the rear legs 104 of the ladder 100. FIG. 17 is a close up view of the retaining tab 1702 depicted in FIG. 2. As illustrated, the retaining tab 1702 is coupled to the support 105 and extends away from the ladder 100. The retaining tab comprises one or more apertures 1702a. The retaining tab can be coupled to the support 105 of the ladder 100 by any suitable means. For example, the retaining tab 1702 can be welded, bolted, screwed, integrally formed with, or otherwise suitably attached to the support 105 of the ladder 100. If desired, the retaining tab 1702 can be provided on a rung 103 of the ladder 100. Or, the retaining tab 1702 can be provided as a separate support attached between the front legs 102 or between the rear legs 104 of the ladder 100, particularly when the front and rear legs 102, 104 do not line up with rungs 802 of the RV OEM ladder 900. Although illustrate in FIGS. 2 and 17 as extending from the support 105, the retaining tab 1702 can extend from a rear side of a step 103. To facilitate locking to standard RV OEM ladders, the retaining tab 1702 can be positioned at 61 inches from a bottom side of a top plate hanger bracket. In this case, the retaining tab 1702 will line up under the 4th rung on the RV OEM ladder when rungs are spaced 15" apart or under the 5th rung on the RV OEM ladder when rungs are spaced 12" apart.

Figure 18:
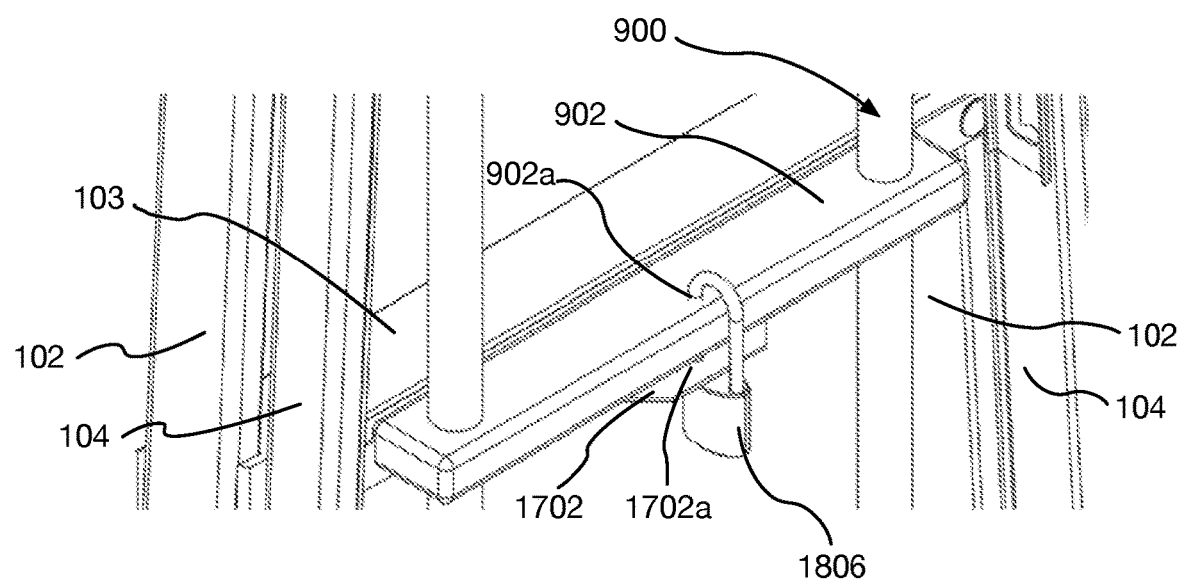
FIG. 18 is a perspective view depicting securing a ladder to an RV OEM ladder via a retaining tab.

FIG. 18 is a perspective view depicting securing the ladder 100 to the RV OEM ladder via the retaining tab 1702. As shown, when the ladder 100 is hung on the RV OEM ladder 900, the retaining tab 1702 is positioned adjacent to one of the rungs 802 of the RV OEM ladder 900. A hole 902a is drilled in the rung 902 of the RV OEM ladder 900. The hole 902a is aligned with the aperture 1702a in the retaining tab 1702 positioned adjacent to the rung 902. A lock 1806 or other suitable device is inserted through the hole 902a and the aperture 1702a to secure the ladder 100 to the RV OEM ladder.

The bracket of the step ladder described herein can be screwed, bolted, riveted, welded, or otherwise suitably attached to the step ladder. For example, the bracket can be attached to the bottom or top of a rung (such as the top rung or another desired rung) of the ladder. The bracket may include side legs that can be attached to the legs of the ladder, allowing the bracket to be attached to the ladder at any desired height along the RV ladder. For example, the bracket can be attached under or over a rung of the RV ladder, or the bracket can be attached between the rungs of the RV ladder by attaching the arms to the legs of the ladder.

The hanging bracket also can replace a rung of the ladder. For example, one or more rungs can include the hanger portion and be attached to the ladder in place of the rung(s). The replaced rung may be the top rung (or tray) or any desired rung. When replacing the top rung (or tray) of a ladder, the hanging bracket may be called a top plate (or tray). As with the previously described bracket, this replacement-rung bracket can be screwed, bolted, riveted, welded, or otherwise suitably attached to the ladder. This configuration saves materials and improves efficiency of manufacturing the ladder. Many conventional step ladders include a plastic or metal tray as the upper rung on the ladder. In certain configurations, the hanging bracket can be molded into this tray.

These configurations allow the hanging bracket of the step ladder to be included on a ladder from the manufacturer. These configurations also allow a user to add the hanging bracket to a conventional step ladder to create a step ladder having the features described herein.

Certain configurations of the step ladder have front support leg bracing and cross supports mounted to the inside towards the main steps. This configuration allows for more compact hanging of the RV Step ladder over the existing RV OEM ladder of the RV. These configurations can allow the step ladder to hang closer to the RV OEM ladder.

The step ladder described herein includes (if desired) a locking mechanism to secure the step ladder to the RV. For example, a latch attached to bottom side of the hanging bracket of the ladder can be pivoted into position to secure the ladder to one of the rungs of the RV OEM ladder that is attached to the RV. The latch includes a hole to align with another hole in the hanging bracket, into which a lock is inserted to prevent opening of the latch. Also, one or more holes in the hanging bracket can be aligned with a corresponding hole in an RV OEM ladder step and secured via a lock through both holes. Similarly, a retaining tab at a lower portion of the ladder can be secured to a lower rung of the RV OEM ladder.

The step ladder described herein also includes (if desired) a stabilizing mechanism on a lower portion of the ladder to secure the lower portion of the ladder to the RV. The stabilizing mechanism includes one or more stabilizing arms that extend away from the legs of the ladder toward the RV. These stabilizing arms are secured to the RV to stabilize the ladder when attached to the RV. For example, the stabilizing arms on the ladder can be received into a stabilizing bracket attached to the RV, and a pin can be inserted through the stabilizing bracket and into/through the stabilizing arms to secure the lower portion of the ladder to the RV. In addition to, or in place of, the locking mechanism discussed previously, a lock can be used with the stabilizing arms and stabilizing brackets to prevent unwanted removal of the ladder from the RV. The stabilizing mechanism is more useful on RVs with only a partial RV OEM ladder. However, the stabilizing mechanism can be used with any size RV OEM ladder.

The ladders discussed herein can be any suitable height. A ladder in the range of seven to eight feet tall typically is sufficient to store on the outside, rear of the RV to access all needed exterior locations of the RV and to use generally around the campsite. However, the innovations described herein apply to any desired height of ladder.

The step ladder described herein has the ability to hang on the RV OEM ladder on the outside of the RV to save on storage space in other areas. The step ladder also can be stored inside the RV, inside a cargo bay of the RV, or in any other suitable storage location. Additionally, the step ladder has uses beyond an RV and can be hung from any suitable location. For example, the step ladder described herein can be hung on any ledge, metal or wood frame or support, shelf, hook, or any other suitable location.

The step ladder described herein has the ability to unfold the ladder into an "A-frame" set-up so a user does not have to lean the ladder against the side of the RV to do service on the exterior of the RV. The step ladder is much safer when working on the RV and more stable than the alternative ladders typically used with RVs.

The step ladder described herein has the ability to reach the highest point on the RV by standing on the second ladder tread from the top (which is 60-65" from ground) of the ladder, where the user's knees can lean against top of the ladder for steadiness. A typical user would be able to reach 12 to 13 feet or more to the highest point of an RV. However, the innovations described herein are applicable to any size ladder.

The step ladder described herein allows a user to climb to the top of the RV in its stored position on the RV's OEM existing ladder without removing the step ladder from its stored position.

The step ladder described herein is safer when getting on or off the RV roof top because the step ladder provides a larger step tread (compared to conventional RV OEM ladders) to stand on at the most critical point when transitioning to or from the roof top.

The step ladder described herein can be locked in its stored position on the RV's OEM ladder. A padlock or other locking mechanism can be installed to secure the step ladder to the RV or to the RV OEM ladder on the RV, by utilizing the hanger bracket locking holes or the retaining tab. Other locking methods or devices can be used to secure the step ladder to the RV.

The components of the RV Step ladder can be made of any suitable material. For example, the hanging bracket can be made of aluminum, steel, plastic, composites, or any other suitable material. For a bracket that will be welded to a ladder, such as a top plate configuration, the bracket may comprise a material similar to the material of the ladder. For instance, an aluminum bracket may be more easily welded to legs of an aluminum ladder, and the manufacturer may choose the desired material to facilitate manufacturing and desired strength. When replacing the conventional top tray of a conventional ladder with a hanging bracket described herein, the hanging bracket can be formed integrally with the top tray and formed from the same material. For example, a conventional plastic top tray can be replaced with a plastic top tray having a hanging bracket portion formed integrally with and extending from the top tray. A conventional aluminum top rung or tray can be replaced with an aluminum top rung or tray having a hanging bracket portion formed integrally with and extending from the top rung or tray. In this same manner, any rung of a conventional ladder can be replaced with a hanging bracket, wherein the replaced rung includes a hanging bracket portion extending therefrom.

The hanger bracket has the ability to attach to many common step ladders on the market today, so that a user can hang the common step ladder on the RV's OEM ladder on the outside of the RV to save on storage space in other areas of the RV. The step ladder hanger bracket also is designed to attach to a conventional step ladder to hang the ladder on an existing RV OEM ladder on the outside of the RV while traveling on the road, instead of placing the ladder in RV storage bays. Storing on the outside leaves more space in the storage bays for other items and provides easier access to the ladder when needed. A user can install the hanger bracket to a conventional ladder to obtain the storage benefits of the step ladder described herein.

Although described herein with reference to a step ladder, the hanging bracket is suitable for any ladder. Including the hanging bracket described herein on a ladder can allow that ladder to be hung for storage over any suitable surface.

The example systems, methods, and components described in the embodiments presented previously are illustrative, and, in alternative embodiments, certain components can be combined in a different order, omitted entirely, and/or combined between different example embodiments, and/or certain additional components can be added, without departing from the scope and spirit of various embodiments. Accordingly, such alternative embodiments are included in the scope of the following claims, which are to be accorded the broadest interpretation so as to encompass such alternate embodiments. For example, each of the hanger bracket, locking mechanism, lower support system, slider brackets, and other ladder components can be used independently or in combination with one or more of each other to create a ladder having one or more benefits of the innovations described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

The invention claimed is:

1. A ladder, comprising:
   two front legs comprising a first front leg and a second front leg, each front leg comprising a length and a depth;
   a plurality of rungs spaced along the length of the two front legs and separating the two front legs, each rung comprising a first end and a second end and having the first end of the rung connected to the first front leg and the second end of the rung connected to the second front leg;
   two rear legs comprising a first rear leg and a second rear leg, the first rear leg being hingeably coupled to the first front leg, and the second rear leg being hingeably coupled to the second front leg; and
   a hanger bracket attached to the two front legs of the ladder, the hanger bracket comprising
     a base spanning from the first front leg to the second front leg and coupled to the first and second front legs,
     an extension extending the hanger bracket laterally away from the base a distance D beyond the depth of the two front legs of the ladder, and
     a hook extending downwardly from a side of the extension that is distal from the base, the extension rigidly connecting the hook to the base.

2. The ladder according to claim 1, wherein a width of at least a portion of the extension is less than a width of the base.

3. The ladder according to claim 1, wherein the hook extends orthogonally away from the extension.

4. The ladder according to claim 1, wherein the distance D of the hanger bracket extending laterally away from the base corresponds to a depth of an object on which the ladder can be hung.

5. The ladder according to claim 4, further comprising an RV ladder coupled to a recreational vehicle, the RV ladder comprising a rung attached thereto, the rung of the RV ladder having a depth, wherein the distance D of the hanger bracket extending laterally away from the base corresponds to the depth of the rung of the RV ladder.

6. The ladder according to claim 1, wherein the hanger bracket is an additional rung between the two front legs of the ladder.

7. The ladder according to claim 1, the base of the hanger bracket comprising a first arm and a second arm, the first arm and the second arm disposed on opposite ends of the base of the hanger bracket, the first arm of the base of the hanger bracket attached to first front leg of the ladder, and the second arm of the base of the hanger bracket attached to the second front leg of the ladder.

8. The ladder according to claim 1, further comprising a retaining tab positioned between the two front legs and attached to one of the rungs positioned lower than the hanger bracket, the retaining tab extending away from the one of the rungs to which it is attached, and the retaining tab comprising an aperture therein configured to receive a lock.

9. The ladder according to claim 1, further comprising:
   a support connected to the two rear legs; and
   a retaining tab positioned between the two rear legs and attached to the support, the retaining tab extending away from the support and comprising an aperture therein configured to receive a lock.

10. The ladder according to claim 1, wherein the hook comprises an aperture therein disposed distally from the extension, the aperture configured to receive a lock.

11. The ladder according to claim 1, wherein the hanger bracket is integrally formed from a single piece of material.

12. The ladder according to claim 1, wherein at least a portion of the hook is open-ended and extends below a side portion of the extension.

13. The ladder according to claim 1, wherein the base is disposed in a plane that is orthogonal to a longitudinal axis of the two front legs of the ladder.

14. A hanger for ladders, comprising:
   a hanger bracket configured to attach to a ladder, the hanger bracket comprising
     a base portion configured to attach to a ladder,
     a hook portion, and
     an extension portion extending said hanger bracket laterally away from said base portion a distance D beyond a depth of front legs of the ladder to which the hanger bracket is configured to be attached,
     said hook portion extending downwardly from a side of said extension portion that is distal from said base portion, and said extension portion rigidly connecting said hook portion to said base portion.

15. The hanger according to claim 14, said hook portion orthogonally projecting away from said extension portion.

16. The hanger according to claim 14, wherein a width of at least a portion of said extension portion is less than a width of said base portion.

17. The hanger according to claim 16, wherein the distance D of said hanger bracket extending laterally away from said base corresponds to a depth of an object on which a ladder comprising said hanger bracket can be hung.

18. The hanger according to claim 14, wherein the hanger bracket is integrally formed from a single piece of material.

19. The hanger according to claim 14, wherein at least a portion of said hook portion is open-ended and extends below a side portion of said extension portion.

20. A ladder, comprising:
   two front legs comprising a first front leg and a second front leg, each front leg comprising a length and a depth;
   a plurality of rungs spaced along the length of the two front legs and separating the two front legs, each rung comprising a first end and a second end and having the first end of the rung connected to the first front leg and the second end of the rung connected to the second front leg;
   two rear legs comprising a first rear leg and a second rear leg, the first rear leg being hingeably coupled to the first front leg, and the second rear leg being hingeably coupled to the second front leg; and a hanger bracket attached to one of the rungs of the ladder, the hanger bracket comprising a base spanning at least a portion of the rung to which it is attached, an extension extending the hanger bracket laterally away from the base a distance D beyond the depth of the two front legs of the ladder, and a hook extending downwardly from a side of the extension that is distal from the base, the extension rigidly connecting the hook to the base.

21. The ladder according to claim 20, wherein the hanger bracket is attached to a top of the rung to which it is attached.

22. The ladder according to claim 20, wherein a width of at least a portion of the extension is less than a width of the base.

23. The ladder according to claim 20, further comprising a retaining tab positioned between the two front legs and attached to another one of the rungs positioned lower than the hanger bracket, the retaining tab extending away from the another one of the rungs to which it is attached, and the retaining tab comprising an aperture therein configured to receive a lock.

24. The ladder according to claim 20, further comprising:

a support connected to the two rear legs; and a retaining tab positioned between the two rear legs and attached to the support, the retaining tab extending away from the support and comprising an aperture therein configured to receive a lock.

25. The ladder according to claim 20, wherein the hook comprises an aperture therein disposed distally from the extension, the aperture configured to receive a lock.

26. The ladder according to claim 20, wherein the hanger bracket is integrally formed from a single piece of material.

27. The ladder according to claim 20, wherein at least a portion of the hook is open-ended and extends below a side portion of the extension.

* * * * *